Oct. 20, 1931.  W. J. SHAW  1,828,089
GUARD FOR WOOD HEEL TURNING MACHINES
Filed Sept. 6, 1927  5 Sheets-Sheet 1

Inventor
Wesley J. Shaw
By David Rines
Attorney

Oct. 20, 1931.  W. J. SHAW  1,828,089
GUARD FOR WOOD HEEL TURNING MACHINES
Filed Sept. 6, 1927     5 Sheets-Sheet 2
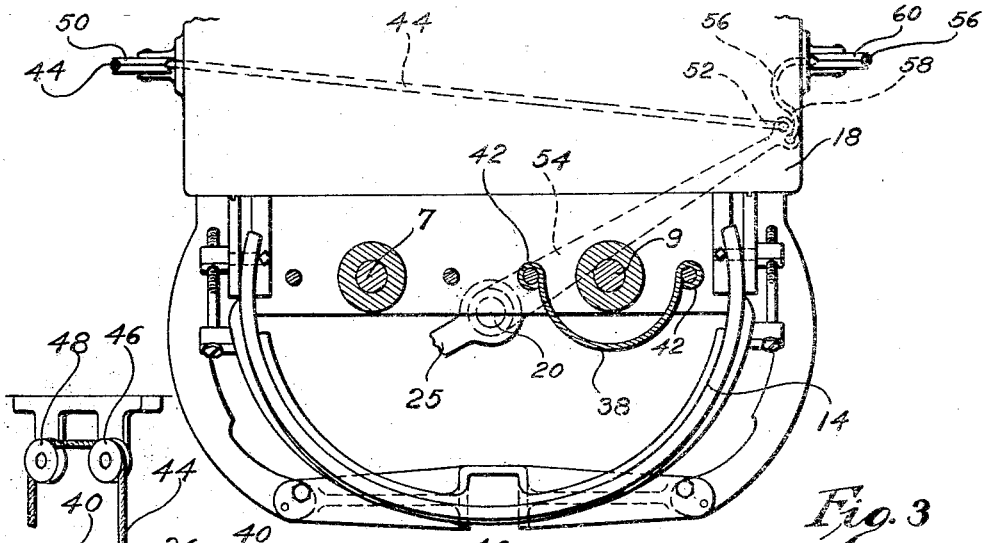
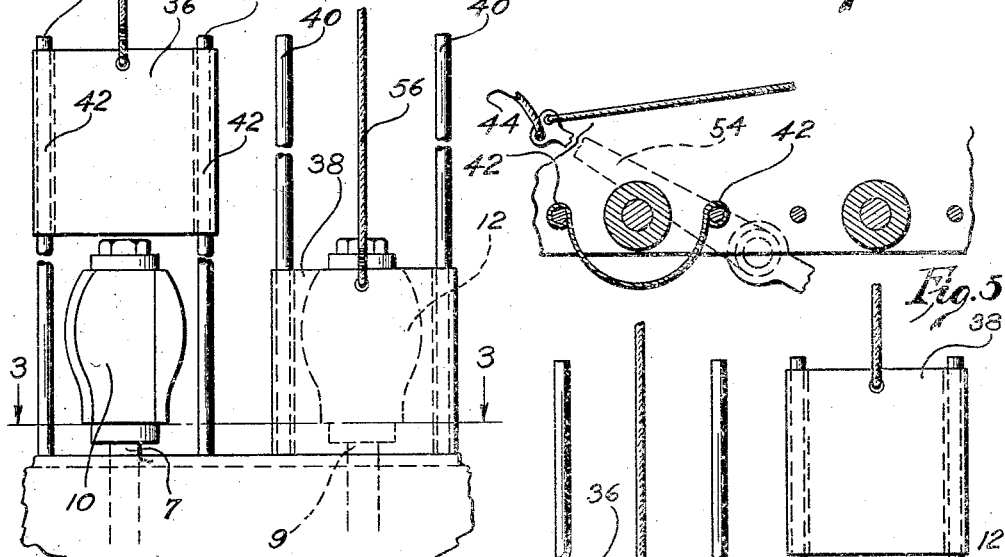
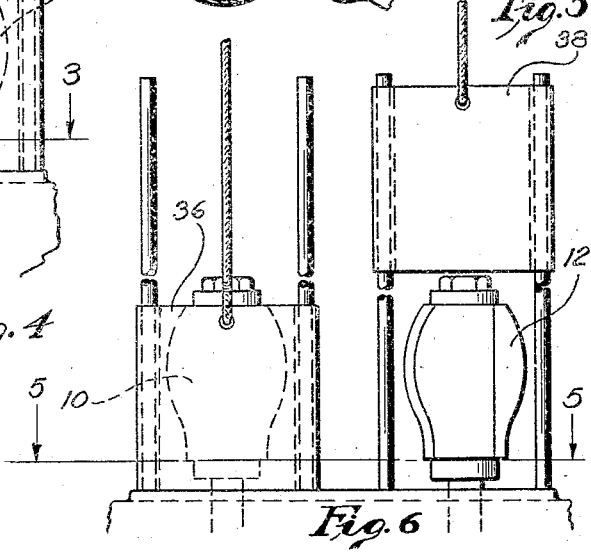
Inventor
Wesley J. Shaw
By
Attorney

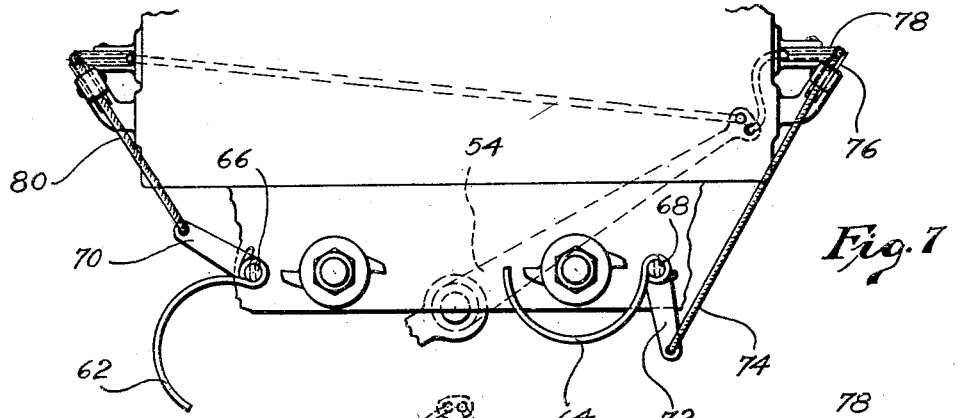
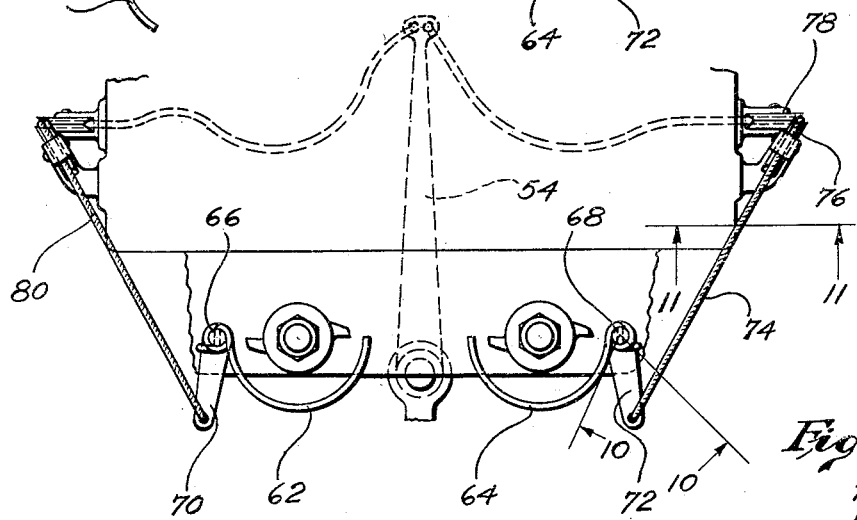
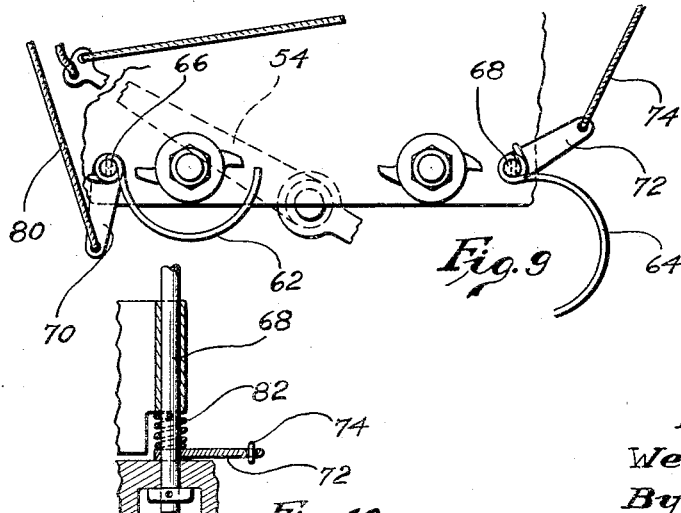
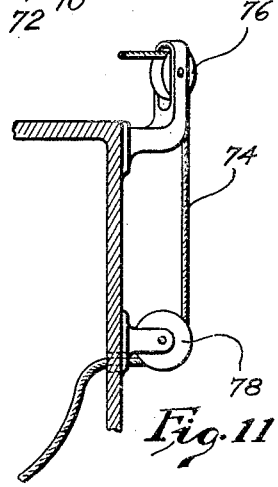

Inventor
Wesley J. Shaw
By David Rives
Attorney

Oct. 20, 1931.  W. J. SHAW  1,828,089
GUARD FOR WOOD HEEL TURNING MACHINES
Filed Sept. 6, 1927   5 Sheets-Sheet 5

Inventor
Wesley J. Shaw
By David Russ
Attorney

Patented Oct. 20, 1931

1,828,089

UNITED STATES PATENT OFFICE

WESLEY JOHN SHAW, OF HAVERHILL, MASSACHUSETTS, ASSIGNOR TO NEW ENGLAND WOOD HEEL CO., OF HAVERHILL, MASSACHUSETTS, A CORPORATION OF MASSACHUSETTS

GUARD FOR WOOD-HEEL-TURNING MACHINES

Application filed September 6, 1927. Serial No. 217,616.

The present invention relates to safety devices for protecting operators from accidental contact with cutting knives, and more particularly to guards for the cutters of wood-heel-turning machines.

Figures 1, 2:
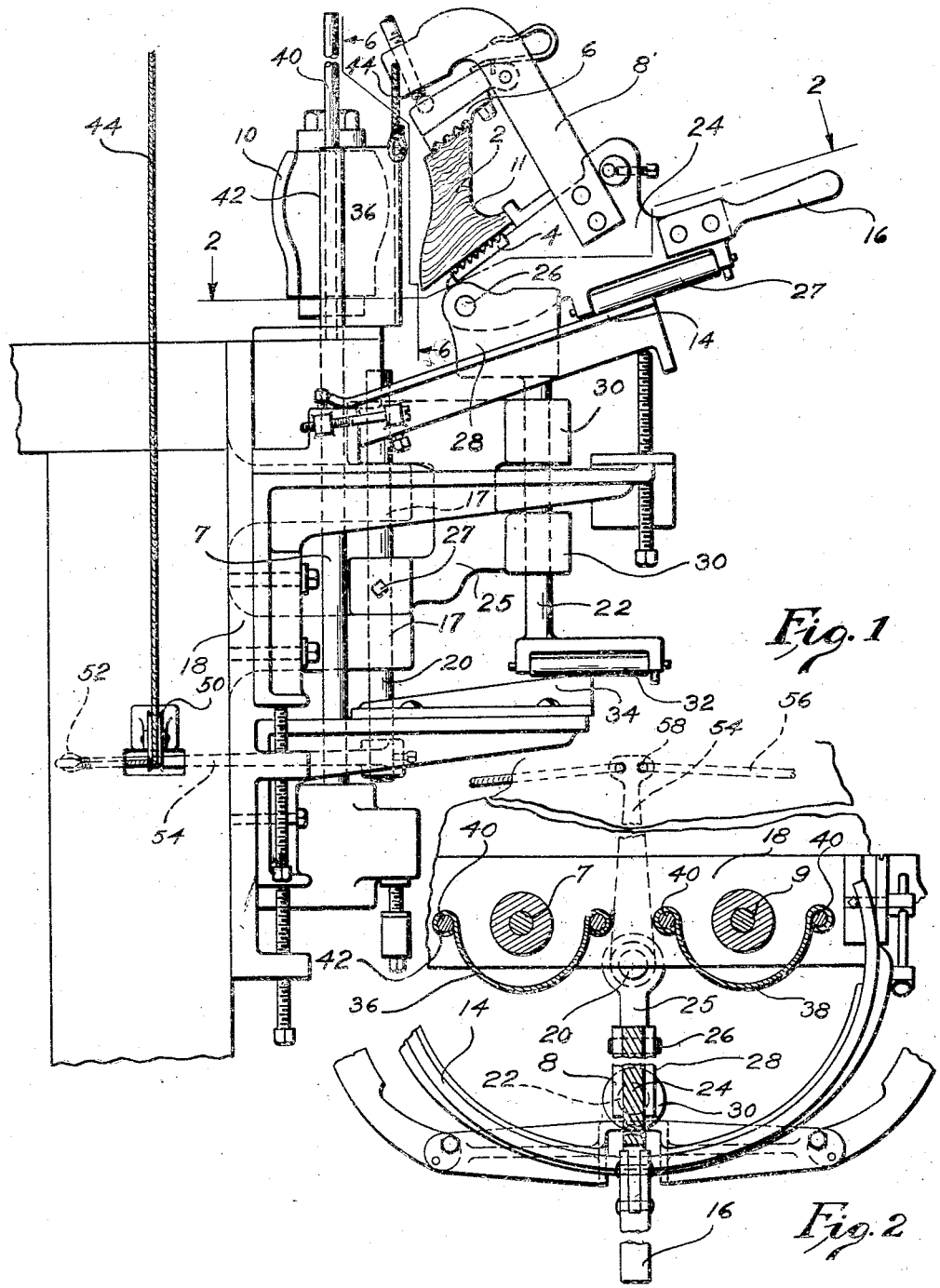
Figures 12, 14:
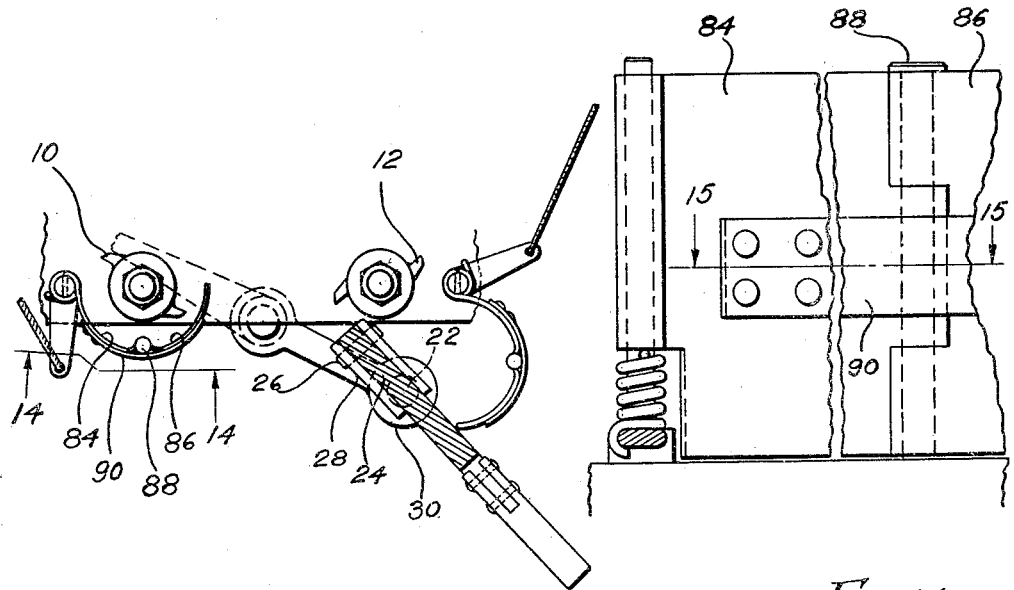
Figures 13, 15:
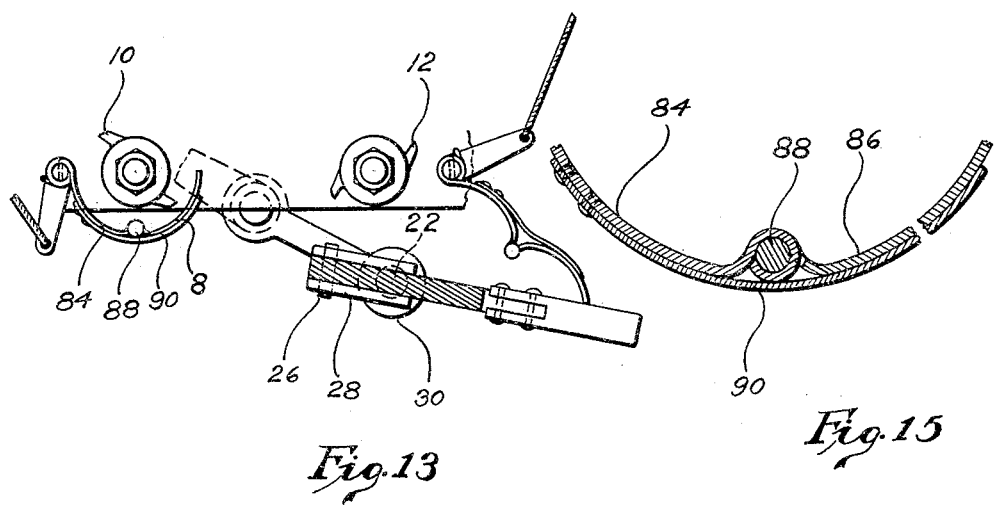
Figure 16:
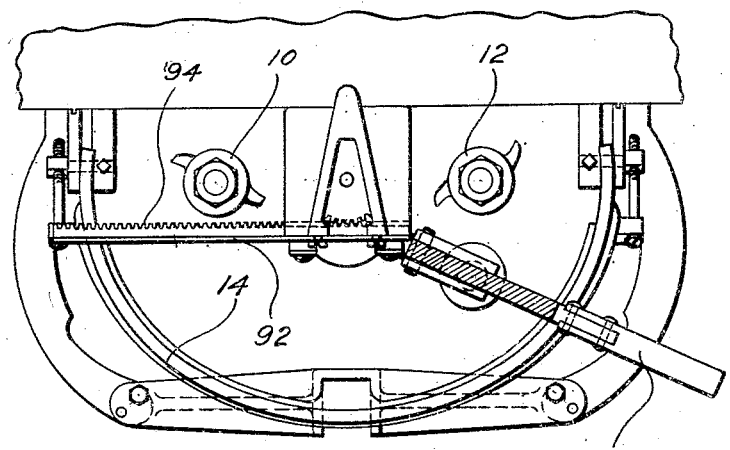
Figure 17:
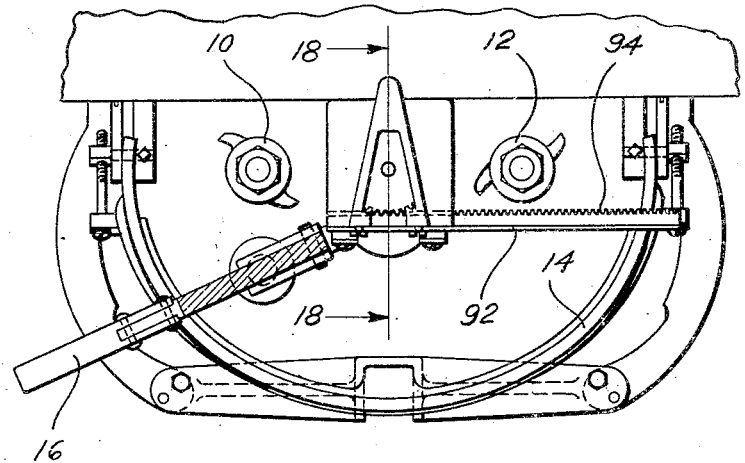
Figure 18:
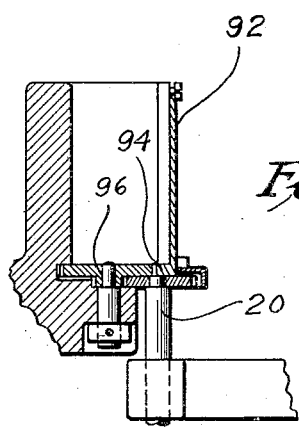

The nature and the objects of the invention will be explained in connection with the accompanying drawings, in which Fig. 1 is an elevation of a portion of a wood-heel-turning machine showing one embodiment of the present invention; Fig. 2 is a section taken upon the lines 2—2 of Fig. 1, looking in the direction of the arrows, the parts being shown in Figs. 1 and 2 with both guards lowered; Fig. 3 is a section taken upon the line 3—3 of Fig. 4, looking in the direction of the arrows; Fig. 4 is a section taken upon the line 6—6 of Fig. 1, the left-hand guard being shown raised; Fig. 5 is a section taken upon the line 5—5 of Fig. 6, looking in the direction of the arrows; Fig. 6 is a view similar to Fig. 4, but with the right-hand guard raised; Fig. 7 is a view similar to Fig. 3 of a modification, showing the left-hand guard moved out of protecting position; Fig. 8 is a view similar to Fig. 2 of the modification shown in Fig. 7; Fig. 9 is a view of the modification shown in Figs. 7 and 8, but with the right-hand guard out of protecting position; Figs. 10 and 11 are sections taken upon the lines 10—10 and 11—11, respectively, of Fig. 8, looking in the direction of the arrows; Fig. 12 is a view similar to Fig. 9 of a further modification; Fig 13 is a view corresponding to Fig. 12 showing the parts in different positions; Fig. 14 is a section taken upon the line 14—14 of Fig. 12, looking in the direction of the arrows, and upon a larger scale; Fig. 15 is a section taken upon the line 15—15 of Fig. 14, looking in the direction of the arrows; Fig. 16 is a view similar to Fig. 5 of a further modification; Fig. 17 is a view similar to Fig. 3 of the modification shown in Fig. 16; and Fig. 18 is a section taken upon the line 18—18 of Fig. 17, looking in the direction of the arrows.

One of the operations connected with the manufacture of wood heels from wood-heel blocks or blanks 2 consists in shaping opposite sides of the block. To this end, the block is clamped between lower and upper jaws 4 and 6 of a clamp 8 that is mounted upon a jack 24, and its opposite sides are successively presented to the action of two horizontally-spaced, turning cutters 10 and 12 that rotate at high speed around vertical axes 7 and 9. In the drawings, the wood heel is illustrated as it appears after the cutters 10 and 12 have already performed their turning operations. Originally, however, at the time that it is first placed in the clamp 8, it is in the form of an unshaped, wood block, except that the breast 11 has previously been grooved. The jack 24 may be swung by the operator horizontally over a curved track 14 by means of a handle 16. When the jack is swung in one direction, the wood block will be presented to the cutter 10; and when swung in the opposite direction, to the cutter 12. In order to permit of such swinging movement, the jack 24 is carried by a horizontally disposed arm 25 that is fixed by set screws 27 or the like to a rod 20. The rod 20 is journaled in vertically disposed bearings 17 of the base 18 of the machine, intermediately between the cutters 10 and 12. The jack 24 is fixed to a rod or shaft 22 that is journaled in bearings 30 of the arm 25. The arm 25, therefore, acts as a kind of link between the rods 20 and 22. It is fixed to the swinging rod 20 but permits free rocking movement of the rod 22 in order to permit swinging movement of the jack 24 about the axis of the rod 22 in the bearings 30. The jack is thus horizontally swingable with the rod 20 about the vertical axis of the latter from an intermediate position between the cutters, illustrated in Figs. 1 and 2, toward either cutter 10 and 12; and after the jack has been swung all the way around to one cutter or the other, it is rocked about the vertically disposed rod or shaft 22, so as to present successive portions of the side of the heel block to the cutter and thus turn the whole side from the breast 11 outward.

As the jack 24 is swung by the operator over the track 14, a roller 29, that is attached to the jack 24, engages the track 14 to tilt the jack 24 about a horizontal pivot pin 26. The pivot pin 26 is carried by an arm 28 that extends out from the upper end of the rod 22.

The pivot pin 26 is also movable vertically, so as to raise and lower the heel block as it is acted on by the cutters. Such vertical movement is permitted by having the rod 22 vertically movable in the bearings 30 of the arm 25. The vertical movement of the rod 22 is automatically effected during the swinging of the jack 24 by a roller 32 that is mounted at the lower end of the rod 22 so as to ride over a second curved track 34. As the jack is swung back and forth, first toward the cutter 10, and then toward the cutter 12, the track 34 causes the pivotal point 26 to rise and fall, and the track 14 causes the roller 27 to rise and fall. The ultimate composite movement, in connection with the shape of the cutters 10 and 12, determines the resulting shape of the heel. The machine, as so far described, is of well-known type, and the purpose of this brief description is merely to provide a setting for the features of novelty about to be described.

Though both cutters 10 and 12 are continuously in operation, only one cutter at a time is doing any actual cutting; and for a great portion of the time, the jack is in the intermediate position, neither cutter being then in use. At the time that the jack has been swung around to either the cutter 10 or the cutter 12, the operator's attention is concentrated on that particular cutter, and there is little danger, therefore, of his accidentally placing his hand in contact therewith, or otherwise becoming injured thereby. Whichever cutter is thus concentrated upon, however, the other cutter is receiving no such attention, and may cause injury, either to the operator himself or to a fellow workman. When the jack occupies its intermediate position, furthermore, both cutters are a source of accidental danger, and it is by no means an uncommon experience for even the most experienced turners to reach a hand absent-mindedly toward one cutter or the other, while clamping and unclamping the blocks.

According to the present invention, therefore, novel means are provided for guarding against injury from both cutters when the jack occupies its intermediate position; and for guarding against injury from either cutter when the operator is presenting a heel block to the other cutter. Separate guards, one for each cutter, are preferred, the guards being interposed between both cutters 10 and 12 and the clamp 8 when the jack occupies its intermediate position, and one or the other guard being automatically movable out of its interposed position when the operator swings the jack over from the intermediate position toward the corresponding cutter. A single guard for both cutters may also be employed, as will hereinafter be explained, but the use of separate guards, each operable independently of the other, and one at a time, causes the operator less work and introduces less wear and tear upon the machine. The guard or guards are connected with the operating mechanism of the machine so that the swinging movement of the jack automatically effects movement of the guards. It is preferred to effect the movement of the guards from an end of the swinging rod 20.

In Figs. 1 to 6, inclusive, there are illustrated two vertically reciprocating guards 36 and 38. Normally, when the jack occupies its mid-position, the guards 36 and 38 occupy their lowermost or protecting position, illustrated in Figs. 1 and 2. When the jack is swung from the intermediate position toward the left-hand cutter 10, the guard 36 becomes automatically raised, as shown in Fig. 4, so as to expose the cutter 10 and permit its shaping one side of the wood-heel block 2. When the jack is moved in the opposite direction from its mid-position, toward the cutter 12, the guard 38 will be raised, as shown in Fig. 6, to permit the cutter 12 to operate on the opposite side of the block 2. The guards are returned to their normal position by gravity, sliding up and down on guide posts 40. The guide posts 40 are positioned in line with the cutter shafts, as illustrated more particularly in Figs. 2, 3 and 5. The guards are provided with terminal side ears 42 that fit about the guide posts, the intermediate portions of the guards being bent outward, as illustrated, to conform to the shape of the cutters.

In order to effect the raising of the guards, one end of a cord 44 is secured to the top of the guard 36. The cord extends over guide pulleys 46, 48 and 50, and its other end 52 is secured to an arm 54 that is fixed to the rod 20 and that occupies a position intermediate between the cutters, as shown in Fig. 2, when the jack occupies its intermediate position. When the jack is swung over the track 14 by the handle 16, therefore, causing the rod 20 to swing therewith, the arm 54 will swing to correspond. When the arm 54 occupies the position illustrated in Fig. 3, the guard 36 will accordingly be raised, as shown in Fig. 4. When the arm 54 is returned to the mid-position, along with the jack 24, the guard 36 will be lowered by gravity toward its normal or protecting position, illustrated in Figs. 1 and 2. Any further movement of the arm 54 toward the position illustrated in Fig. 5 will have no effect upon the guard 36, the cord 44 at such time merely becoming slack.

Such further movement will, however, effect the raising of the guard 38 through a cord 56 one end of which is secured to the guard 38, and the other end of which, 58, is secured to the arm 54, the cord 56 extending over pulleys similar to the pulleys 46 and 48 (not shown) and over a pulley 60 corresponding to the pulley 50. When the arm 54 is moved to the position shown in Fig. 3, in order to raise the guard 36, the guard 38 will be returned by gravity to its normal position illustrated in Fig. 4, further movement beyond the mid-position of the arm 54 having no effect upon the guard 38, the cord 56 merely becoming slack, as shown in Fig 3.

It will be understood that the arm 54 should be sufficiently long so as to cause the guards 36 and 38 to be raised sufficiently high, in order that they may be entirely out of the way of the operator at the time that the actual turning operations are being performed. The multiplying raising action of the guards may be effected also in other ways than merely by properly dimensioning the arm 54.

Instead of raising and lowering the guards, they may be pivoted to swing in a horizontal plane outward, out of protecting position, as illustrated in Figs. 7 to 11. The guards 62 and 64 therein illustrated are secured to vertically disposed swinging pivotal rods 66 and 68, respectively, each fixed near one of the cutters, and each provided with a fixed arm 70 and 72 so as to produce a bell-crank-lever effect. The arm 72 at the lower end of the rod 68 may be secured to one end of a cord 74, the other end of which is secured to the arm 54, as before described. The cord 74 may be caused to extend over various pulleys 76 and 78. A similar cord 80 is similarly connected to the arm 72 and the arm 54 and extends over similar pulleys.

The operation will be understood from the description already given of the guards illustrated in Figs. 1 to 6. When the jack is moved to the left, toward the cutter 10, the corresponding guard 62 is pivoted outward out of protecting or interposed position about the axis of the pivotal rod 66, as illustrated in Fig. 7. When the jack is moved toward the other cutter 12, the corresponding guard 64 will be actuated. The guards will be returned inward into their normal or interposed position by springs 82 encirling the rods 66 and 68, respectively.

As before described, the dimensions of the parts must be properly designated so as to open the guards to a sufficiently large extent. In order to increase this opening movement, the construction shown in Figs. 12 to 15 may be employed. In this latter modification, each guard is composed of two parts 84 and 86, hinged together at 88, and yieldingly maintained in a normal position by spring 90. At the extreme movements of the handle 16, it will engage the portion 86 of one guard or the other, as the case may be, causing such portion to pivot about the hinge pintle 88, in opposition to the action of the spring 90, out of its normal position, thereby further to open out the guard, the operation in other respects the same as before described.

A single-guard construction is illustrated in Figs. 16 to 18. Normally, it is interposed between the cutters and the clamp 8 when the jack occupies its intermediate position. When the jack is actuated to the right, towards the cutter 12, the single guard is reciprocated in a straight, horizontal path to the left, towards the right, so as to move out of the way of the cutter 12, but without uncovering the cutter 10. This is illustrated in Fig. 16. A similar result is effected for the other cutter, as shown in Fig. 17. This movement is effected by gearing the guard to the top of the rod 20. To this end, the bottom of the guard is provided with a rack 94 and the top of the rod 20 with a meshing pinion 96.

Other modifications, too, will occur to persons skilled in the art, and all such are considered to fall within the spirit and scope of the invention, as defined in the appended claim.

What is claimed is:

A heel-turning machine having, in combination, two horizontally spaced cutters for respectively turning opposite sides of a heel block, a clamp for holding the heel block, a jack upon which the clamp is mounted, the jack being constructed and arranged to swing from an intermediate position between the cutters toward either cutter, a vertically slidable guard for each cutter, the guards being interposed between the cutters and the clamp when the jack occupies the intermediate position, and means for sliding each guard vertically out of its interposed position when the jack is swung from the intermediate position toward the corresponding cutter.

In testimony whereof, I have hereunto subscribed my name.

WESLEY J. SHAW.